US011221619B2

(12) United States Patent
Udagawa et al.

(10) Patent No.: US 11,221,619 B2
(45) Date of Patent: Jan. 11, 2022

(54) AUTONOMOUS DRIVING SYSTEM

(71) Applicant: TOYOTA JIDOSHA KABUSHIKI KAISHA, Toyota (JP)

(72) Inventors: Yusuke Udagawa, Susono (JP); Mitsutaka Tanimoto, Numazu (JP); Masateru Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 293 days.

(21) Appl. No.: 16/243,613

(22) Filed: Jan. 9, 2019

(65) Prior Publication Data
US 2019/0265695 A1 Aug. 29, 2019

(30) Foreign Application Priority Data

Feb. 27, 2018 (JP) .............................. JP2018-032939

(51) Int. Cl.
*G05D 1/00* (2006.01)
*G06F 16/29* (2019.01)
*G05D 1/02* (2020.01)

(52) U.S. Cl.
CPC ......... *G05D 1/0055* (2013.01); *G05D 1/0088* (2013.01); *G05D 1/0274* (2013.01); *G06F 16/29* (2019.01); *G05D 2201/0213* (2013.01)

(58) Field of Classification Search
CPC ...... G05D 1/00; G05D 1/0055; G05D 1/0088; G05D 1/02; G05D 1/021; G05D 1/0268;
(Continued)

(56) References Cited

U.S. PATENT DOCUMENTS 7,259,660 B2 * 8/2007 Ewerhart ................. B60Q 9/00
340/436
2010/0191421 A1 7/2010 Nilsson
(Continued)

FOREIGN PATENT DOCUMENTS

CN 107128314 A 9/2017
DE 102006028625 A1 * 10/2007 ............... G08G 1/02
(Continued)

OTHER PUBLICATIONS

"DE102006028625A1_description_translation": translation of original patent document description, created Dec. 22, 2020 using Espacenet Patent Translate, pp. 1-13 (Year: 2007).*

*Primary Examiner* — Geepy Pe
*Assistant Examiner* — Michael Allen Brace, Jr.
(74) *Attorney, Agent, or Firm* — Sughrue Mion, PLLC

(57) ABSTRACT

An autonomous driving system installed on a vehicle includes: an information acquisition device configured to acquire driving environment information indicating driving environment for the vehicle; and an autonomous driving control device configured to control autonomous driving of the vehicle based on the driving environment information. The driving environment information includes: map information; and size information indicating a size of a routing object that moves integrally with the vehicle. The autonomous driving control device refers to the map information and the size information to determine a travel route through which the routing object can pass without protruding from a roadway as a target travel route to a destination.

5 Claims, 10 Drawing Sheets

(58) Field of Classification Search
CPC ............. G05D 1/0274; G05D 2201/00; G05D 2201/02; G05D 2201/0213; G06F 16/00; G06F 16/20; G06F 16/29
See application file for complete search history.

(56) References Cited

U.S. PATENT DOCUMENTS

| | | | |
|---|---|---|---|
| 2016/0176403 A1* | 6/2016 | Weston | B60W 30/162 |
| | | | 701/96 |
| 2016/0314357 A1* | 10/2016 | Fey | H04N 5/232 |
| 2016/0349755 A1 | 12/2016 | Kuwahara et al. | |
| 2017/0247054 A1* | 8/2017 | Lee | B62D 15/029 |
| 2017/0365170 A1* | 12/2017 | Lazic | G08G 1/143 |
| 2018/0024564 A1 | 1/2018 | Matsuda | |
| 2018/0058865 A1 | 3/2018 | Takeuchi et al. | |

FOREIGN PATENT DOCUMENTS

| | | |
|---|---|---|
| JP | 6-186050 A | 7/1994 |
| JP | 2010-536632 A | 12/2010 |
| JP | 2016-205971 A | 12/2016 |
| JP | 2016-215921 A | 12/2016 |
| WO | 2016/110728 A1 | 7/2016 |

* cited by examiner

AUTONOMOUS DRIVING SYSTEM

BACKGROUND

Technical Field

The present disclosure relates to an autonomous driving system installed on a vehicle.

Background Art

Patent Literature 1 discloses a control device for a vehicle. The control device creates a planned route and makes the vehicle travel along the planned route. When creating the planned route, the control device takes weight into consideration. For example, in a case of towing travel, a sum of weight of the vehicle and a towed vehicle is larger than weight of the vehicle alone. Therefore, if the vehicle travels with a same turning radius as in a case of non-towing travel, a centrifugal force may become excessive. In view of the above, in the case of the towing travel, the control device increases the turning radius as compared with the case of the non-towing travel in consideration of increase in the weight.

LIST OF RELATED ART

Patent Literature 1: Japanese Unexamined Patent Application Publication No. 2016-215921

SUMMARY

An autonomous driving system installed on a vehicle determines a target travel route to a destination. The target travel route should be one through which the vehicle can actually pass. For example, when a narrow zone is included in the target travel route, there is a possibility that a wide vehicle cannot pass through the narrow zone. As another example, when an acute-angled curve zone is included in the target travel route, there is a possibility that a long vehicle cannot pass through the acute-angled curve zone. If an actual vehicle cannot pass through the target travel route determined by the autonomous driving system, confidence in the autonomous driving system is deteriorated.

According to the conventional technique disclosed in the above-mentioned Patent Literature 1, the turning radius is determined in consideration of weight of the vehicle and the towed vehicle. However, the conventional technique does not describe a perspective that considers sizes of the vehicle and the towed vehicle.

An object of the present disclosure is to provide an autonomous driving system that can determine an appropriate target travel route through which a vehicle can pass.

A first disclosure is directed to an autonomous driving system installed on a vehicle.

The autonomous driving system includes:

an information acquisition device configured to acquire driving environment information indicating driving environment for the vehicle; and an autonomous driving control device configured to control autonomous driving of the vehicle based on the driving environment information.

The driving environment information includes:

map information; and size information indicating a size of a routing object that moves integrally with the vehicle.

The autonomous driving control device refers to the map information and the size information to determine a travel route through which the routing object can pass without protruding from a roadway as a target travel route to a destination.

A second disclosure further has the following feature in addition to the first disclosure.

The autonomous driving control device is further configured to:

calculate, based on the map information, a curvature parameter equivalent to a curvature of a curve zone included in a travel route to the destination; and judge whether or not the routing object can pass through the curve zone based on the curvature parameter and the size information.

A third disclosure further has the following feature in addition to the first or second disclosure.

The autonomous driving control device is further configured to determine a target path based on the driving environment information, and to control travel of the vehicle to follow the target path.

The autonomous driving control device is further configured to refer to the size information to determine the target path such that a distance between the routing object and a surrounding object is equal to or larger than a predetermined value.

A fourth disclosure further has the following feature in addition to any one of the first to third disclosures.

The routing object is the vehicle.

A fifth disclosure further has the following feature in addition to any one of the first to third disclosures.

The routing object includes:

the vehicle; and a towed vehicle towed by the vehicle.

A length of the routing object is a sum of a length of the vehicle and a length of the towed vehicle.

A width of the routing object is a larger one of a width of the vehicle and a width of the towed vehicle.

A height of the routing object is a larger one of a height of the vehicle and a height of the towed vehicle.

The autonomous driving system according to the present disclosure determines the target travel route to the destination in consideration of the size of the routing object. More specifically, the autonomous driving system determines a travel route through which the muting object can pass without protruding from a roadway as the target travel route to the destination. As a result, a situation where the actual routing object cannot pass through the target travel route determined by the autonomous driving system is prevented from occurring. Therefore, confidence in the autonomous driving system increases.

EMBODIMENTS

Embodiments of the present disclosure will be described below with reference to the attached drawings.

1. Outline

Figure 1:
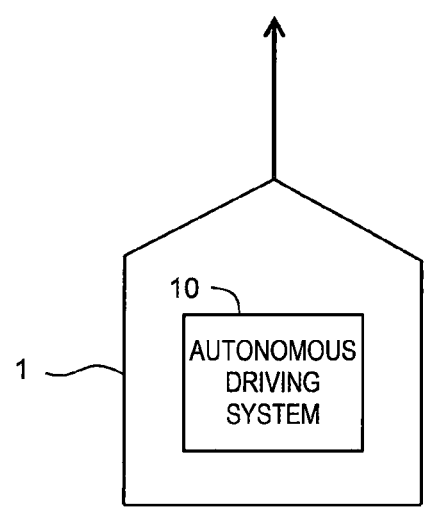
FIG. 1 is a conceptual diagram for explaining an autonomous driving system according to an embodiment of the present disclosure.

FIG. 1 is a conceptual diagram for explaining an autonomous driving system 10 according to the present embodiment. The autonomous driving system 10 is installed on a vehicle 1 and performs "autonomous driving control" that controls autonomous driving of the vehicle 1. In the autonomous driving control, the autonomous driving system 10 determines a target travel route being a travel route to a destination. Then, the autonomous driving system 10 executes the autonomous driving such that the vehicle 1 travels to the destination along the target travel route.

Figure 2:
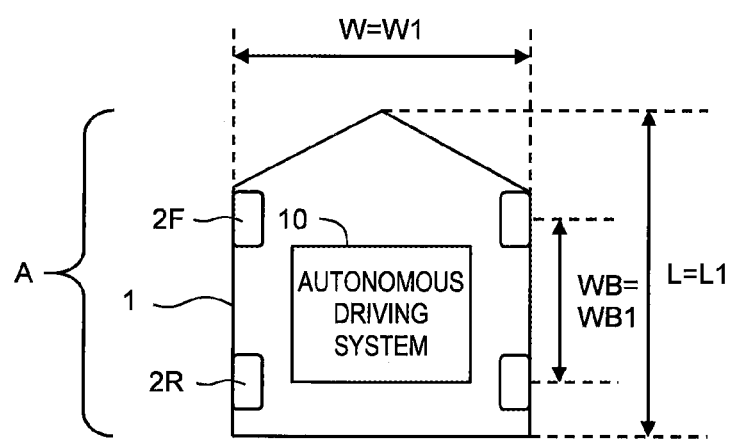
FIG. 2 is a conceptual diagram for explaining a size of a routing object in a non-towing state.
Figure 3:
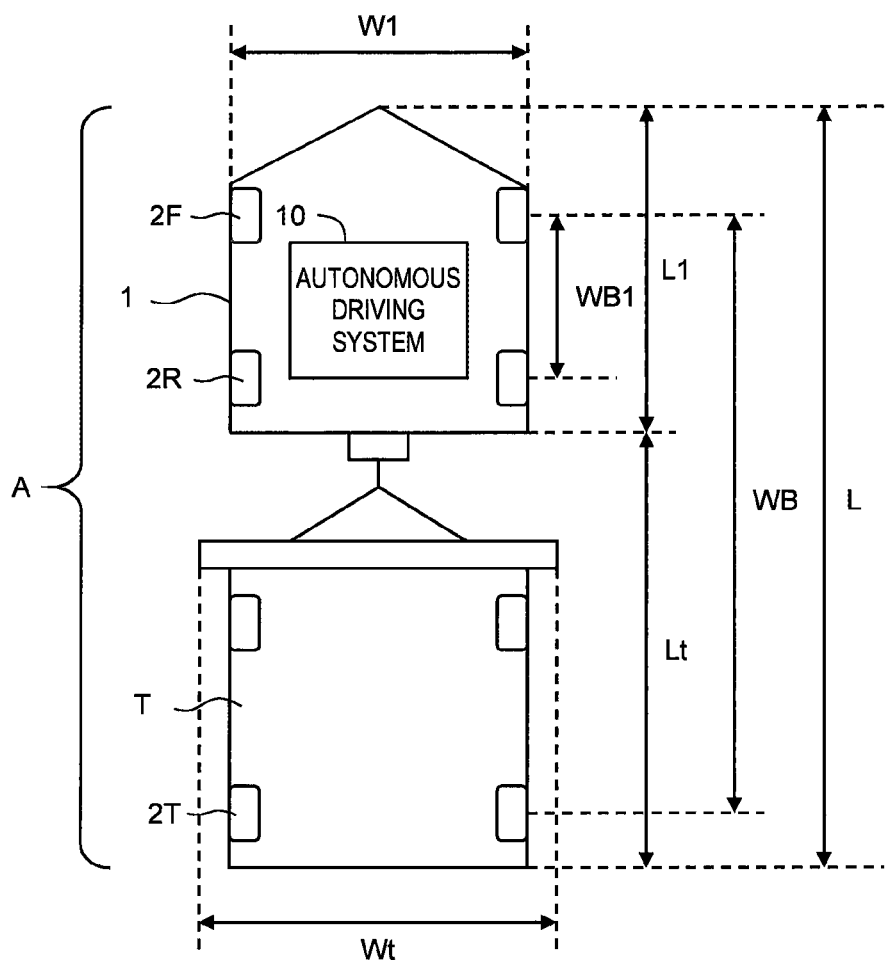
FIG. 3 is a conceptual diagram for explaining a size of a routing object in a towing state.

Here, let us define a term "routing object A" used in the present embodiment. The routing object A is an object that moves along the target travel route and should be taken into consideration when determining the target travel route. FIG. 2 shows a "non-towing state" where the vehicle 1 does not tow another vehicle. In the case of the non-towing state, the routing object A is the vehicle 1. FIG. 3 shows a "towing state" where the vehicle 1 tows a towed vehicle (trailer) T. In the case of the towing state, the routing object A is the whole of the vehicle 1 and the towed vehicle T. That is to say, the routing object A is an object that includes at least the vehicle 1 and moves integrally with the vehicle 1.

The target travel route determined by the autonomous driving system 10 should be one through which the routing object A can actually pass. For example, when a narrow zone is included in the target travel route, there is a possibility that a wide routing object A cannot pass through the narrow zone. As another example, when an acute-angled curve zone is included in the target travel route, there is a possibility that a long routing object A cannot pass through the acute-angled curve zone. If an actual routing object A cannot pass through the target travel route determined by the autonomous driving system 10, confidence in the autonomous driving system 10 is deteriorated.

In view of the above, the autonomous driving system 10 according to the present embodiment determines the target travel route to the destination in consideration of a "size" of the routing object A. The size includes at least a "length" in a longitudinal direction. The reason is that the "length" contributes greatly to a difference in turning radius between inner front and rear wheels during turning. The size may further include a "width" in a lateral direction, a "height" in a vertical direction, a wheel base, and so forth.

In the case of the non-towing state shown in FIG. 2, the routing object A is the vehicle 1. A length L, a width W, and a height (not shown) of the routing object A are equal to a length L1, a width W1, and a height of vehicle 1, respectively. A wheel base WB of the routing object A is equal to a wheel base WB1 between a front wheel 2F and a rear wheel 2R of the vehicle 1.

In the case of the towing state shown in FIG. 3, the routing object A is the whole of the vehicle 1 and the towed vehicle T. A length L of the routing object A is a sum of the length L1 of the vehicle 1 and a length Lt of the towed vehicle T. A width W of the routing object A is a larger one of the width W1 of the vehicle 1 and a width Wt of the towed vehicle T. A height (not shown) of the routing object A is a larger one of the height of the vehicle 1 and a height of the towed vehicle T. A wheel base WB of the routing object A is a distance between the front wheel 2F of the vehicle 1 and a rearmost wheel 2T of the towed vehicle T.

The autonomous driving system 10 according to the present embodiment determines the target travel route to the destination in consideration of the size of the routing object A. More specifically, the autonomous driving system 10 determines a travel route through which the routing object A can pass without protruding from a roadway as the target travel route to the destination. As a result, a situation where the actual routing object A cannot pass through the target travel route determined by the autonomous driving system 10 is prevented from occurring. Therefore, confidence in the autonomous driving system 10 increases.

Hereinafter, the autonomous driving system 10 according to the present embodiment will be described in more detail.

2. Configuration of Autonomous Driving System

Figure 4:
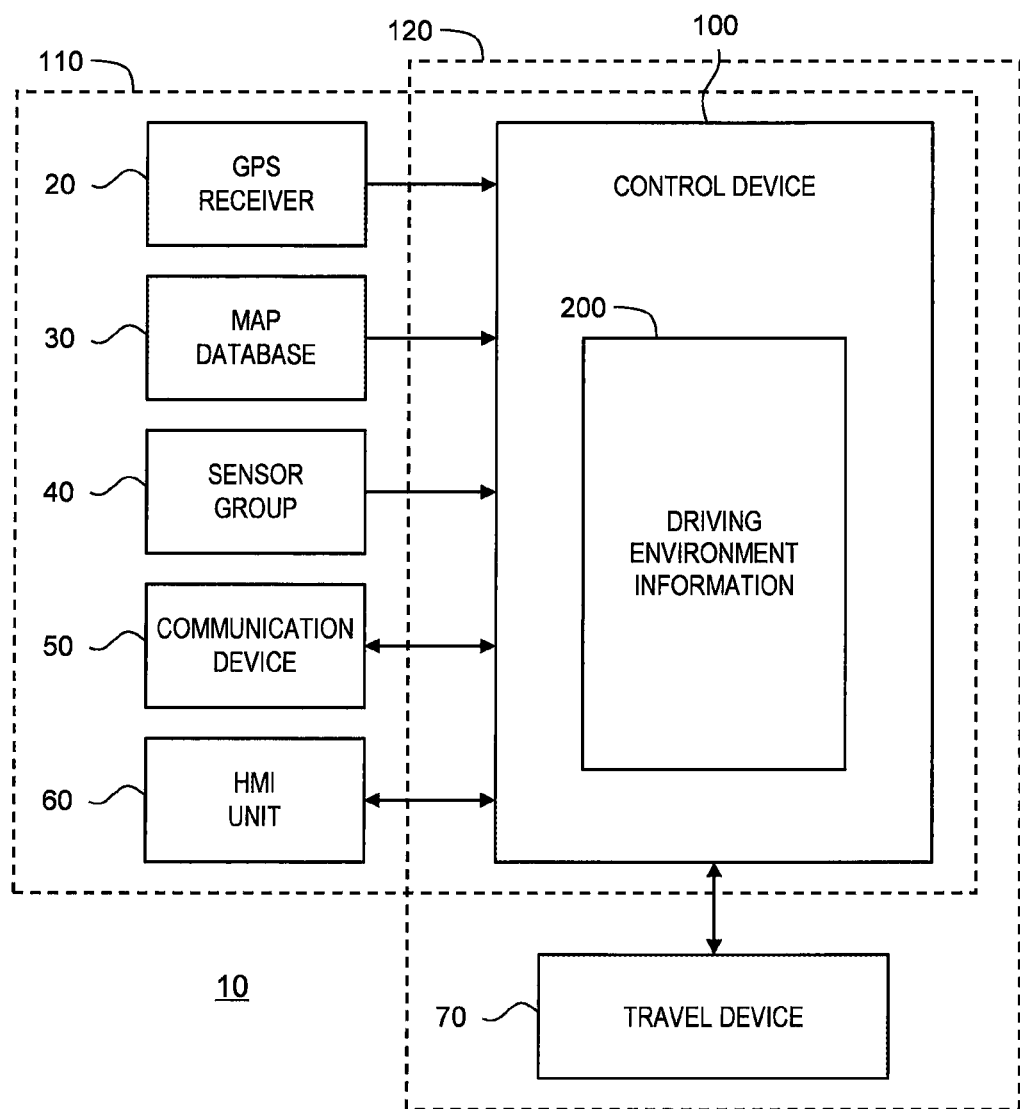
FIG. 4 is a block diagram showing a configuration example of the autonomous driving system according to the embodiment of the present disclosure.

FIG. 4 is a block diagram showing a configuration example of the autonomous driving system 10 according to the present embodiment. The autonomous driving system 10 is provided with a GPS (Global Positioning System) receiver 20, a map database 30, a sensor group 40, a communication device 50, an HMI (Human Machine Interface) unit 60, a travel device 70, and a control device (controller) 100.

The GPS receiver 20 receives signals transmitted from a plurality of GPS satellites and calculates a position and an orientation of the vehicle 1 based on the received signals.

Map information is recorded in the map database 30. The map information includes information of lane geometries (lane positions, lane shapes). The map information may further include position information regarding roadside structures such as walls, buildings, road signs, and the like.

The sensor group 40 includes a surrounding situation sensor that detects a situation around the vehicle 1. The surrounding situation sensor is exemplified by a LIDAR (Laser Imaging Detection and Ranging), a radar, a stereo camera, and so forth. The LIDAR uses laser lights to detect a target around the vehicle 1. The radar uses radio waves to detect a target around the vehicle 1. The stereo camera images a situation around the vehicle 1.

Moreover, the sensor group 40 includes a vehicle state sensor that detects a travel state of the vehicle 1. The vehicle state sensor is exemplified by a vehicle speed sensor, a steering angle sensor, and so forth. The vehicle speed sensor detects a speed of the vehicle 1. The steering angle sensor detects a steering angle of the vehicle 1. Furthermore, the vehicle state sensor includes a towing state sensor that detects whether or not the towed vehicle T is connected to the vehicle 1.

The communication device 50 communicates with the outside of the vehicle 1. For example, the communication device 50 performs a V2I communication (a vehicle-to-infrastructure communication) with a surrounding infrastructure. The communication device 50 may perform a V2V communication (a vehicle-to-vehicle communication) with a surrounding vehicle.

The HMI unit 60 is an interface for proving a driver with information and receiving information from the driver. More specifically, the HMI unit 60 includes an input device and an output device. The input device is exemplified by a touch panel, a switch, a microphone, and the like. The output device is exemplified by a display device, a speaker, and the like.

The travel device 70 includes a steering device, a driving device, and a braking device. The steering device turns wheels. The driving device is a power source that generates a driving force. The driving device is exemplified by an engine and an electric motor. The braking device generates a braking force.

The control device (controller) 100 controls the autonomous driving of the vehicle 1. The control device 100 is a microcomputer including a processor and a memory device. The control device 100 is also called an ECU (Electronic Control Unit). The autonomous driving control by the control device 100 is achieved by the processor executing a control program stored in the memory device.

More specifically, the control device 100 acquires information necessary for the autonomous driving control. The information necessary for the autonomous driving control is information indicating driving environment for the vehicle 1, and the information is hereinafter referred to as "driving environment information 200". The driving environment information 200 is stored in the memory device, and read out and used as appropriate.

Figure 5:
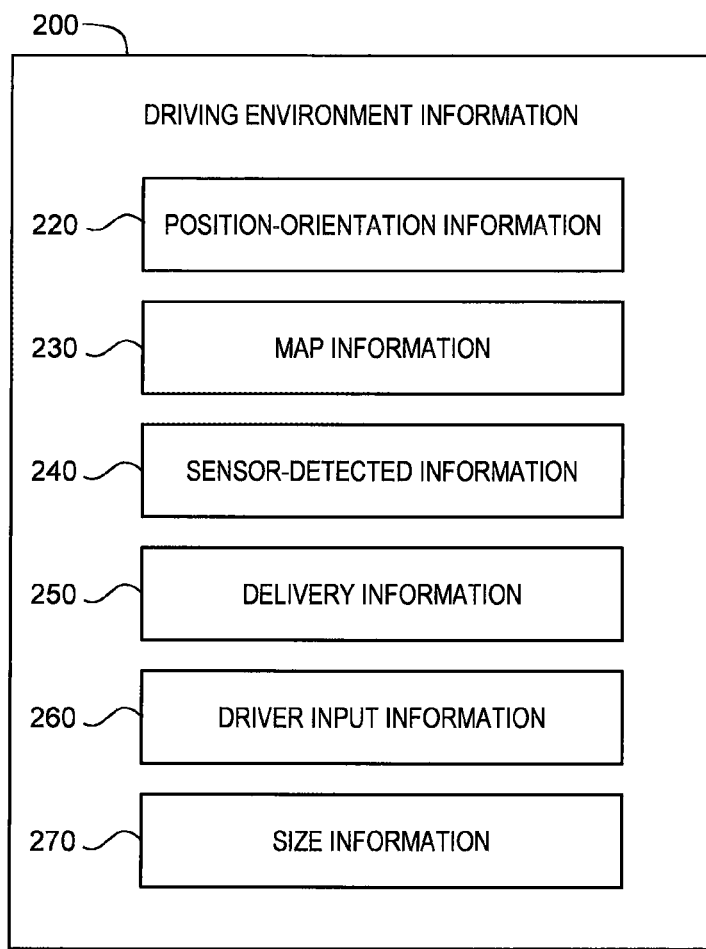
FIG. 5 is a block diagram showing an example of driving environment information used in the autonomous driving system according to the embodiment of the present disclosure.

FIG. 5 shows an example of the driving environment information 200 in the present embodiment. The driving environment information 200 includes position-orientation information 220, map information 230, sensor-detected information 240, delivery information 250, driver input information 260, and size information 270.

The position-orientation information 220 indicates the position and the orientation of the vehicle 1. The control device 100 acquires the position-orientation information 220 from the GPS receiver 20.

The map information 230 includes information of lane geometries (lane positions, lane shapes). The map information 230 may further include position information regarding roadside structures such as walls, buildings, road signs, and the like. The control device 100 acquires the map information 230 around the vehicle 1 and to the destination based on the position-orientation information 220 and the map database 30. Based on the map information 230, the control device 100 can recognize a roadway (i.e. an area for vehicle travel), lane curvature, lane merging, lane branching, roadside structures, and so forth.

The sensor-detected information 240 is information acquired based on a result of detection by the sensor group 40. More specifically, the sensor-detected information 240 includes target information regarding a target around the vehicle 1. The target around the vehicle 1 is exemplified by the towed vehicle T, a surrounding vehicle, a white line, a roadside structure, and so forth. In addition, the sensor-detected information 240 includes vehicle state information indicating a state of the vehicle 1. The state of the vehicle 1 is exemplified by the vehicle speed, the steering angle, the towing state, and so forth. The control device 100 acquires the sensor-detected information 240 based on the result of detection by the sensor group 40.

The delivery information 250 is information acquired through the communication device 50. The control device 100 acquires the delivery information 250 by using the communication device 50 to communicate with the outside of the vehicle 1.

The driver input information 260 is information input through the HMI unit 60. The driver uses the HMI unit 60 to input necessary information. The control device 100 acquires the driver input information 260 through the HMI unit 60.

The size information 270 indicates the size of the routing object A. The routing object A may be the vehicle 1 (see FIG. 2) or may be the whole of the vehicle 1 and the towed vehicle T (see FIG. 3). The control device 100 recognizes whether or not the vehicle 1 tows the towed vehicle T based on the towing state included in the sensor-detected information 240. Then, the control device 100 acquires the necessary size information 270 according to the towing state.

Information of the size of the vehicle 1 is beforehand store in the control device 100. Various examples can be considered as a method for acquiring the size of the towed vehicle T. For example, the control device 100 uses the surrounding situation sensor to detect the towed vehicle T as a target and then acquires the size of the towed vehicle T from the detection result (i.e. the sensor-detected information 240). As another example, the control device 100 may receive the delivery information 250 indicating the size of the towed vehicle T from an external system through the communication device 50. As still another example, the control device 100 may receive the driver input information 260 indicating the size of the towed vehicle T from the driver through the HMI unit 60.

It can be said that the GPS receiver 20, the map database 30, the sensor group 40, the communication device 50, the HMI unit 60, and the control device 100 constitute an "information acquisition device 110" that acquires the driving environment information 200, as shown in FIG. 4.

The control device 100 controls the autonomous driving of the vehicle 1 based on the driving environment information 200. More specifically, the control device 100 creates a travel plan of the vehicle 1 based on the driving environment information 200. The travel plan includes the target travel route to the destination and a local target path (target trajectory). The control device 100 appropriately actuates the travel device 70 to make the vehicle 1 travel in accordance with the travel plan.

It can be said that the control device 100 and the travel device 70 constitute an "autonomous driving control device 120" that controls the autonomous driving of the vehicle 1 based on the driving environment information 200, as shown in FIG. 4. Hereinafter, processing by the autonomous driving control device 120 according to the present embodiment will be described in more detail.

Figure 6:
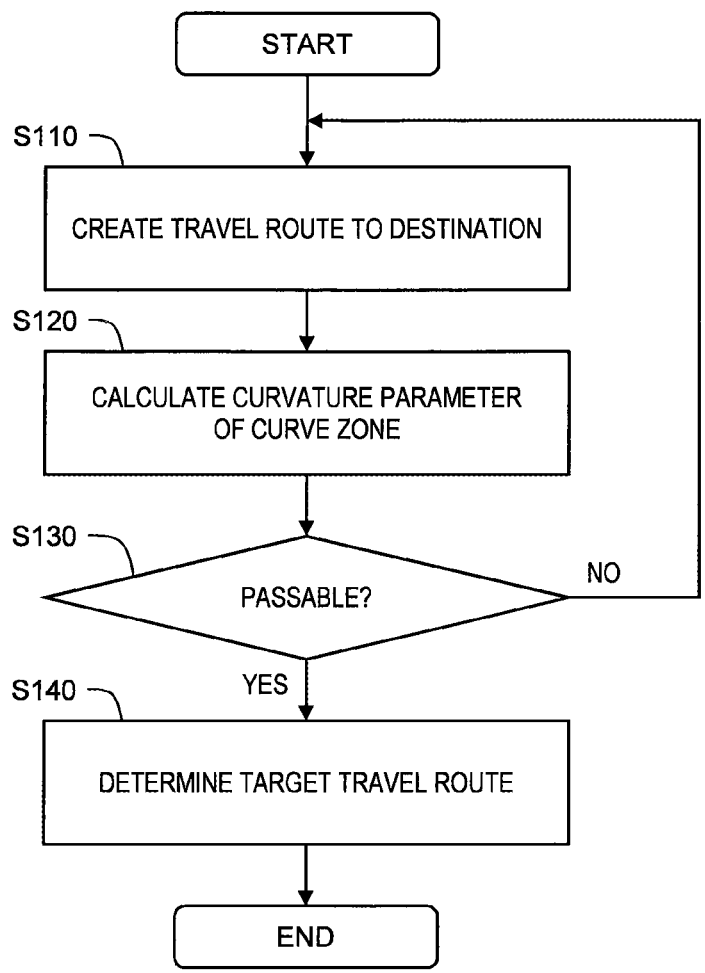
FIG. 6 is a flow chart showing a method of determining a target travel route in the embodiment of the present disclosure.

3. Processing by Autonomous Driving Control Device 3-1. Determination of Target Travel Route FIG. 6 is a flow chart showing a method of determining the target travel route in the present embodiment.

In Step S110, the autonomous driving control device 120 creates a travel route (tentative travel route) to the destination based on the position-orientation information 220 and the map information 230. After that, the processing proceeds to Step S120.

In Step S120, the autonomous driving control device 120 extracts a curve zone included in the travel route created in Step S110. Then, the autonomous driving control device 120 calculates a curvature parameter of the curve zone based on the map information 230. The curvature parameter is a parameter equivalent to a curvature $1/R$. The curvature parameter may be the curvature $1/R$ or may be a curvature radius $R$. After that, the processing proceeds to Step S130.

In Step S130, the autonomous driving control device 120 judges whether or not the routing object A can pass through the travel route determined in Step S110. More specifically, the autonomous driving control device 120 refers to the map information 230 and the size information 270 to judge whether or not the routing object A can pass through the travel route without protruding from a roadway.

For example, the autonomous driving control device 120 judges whether or not the routing object A can pass through the curve zone extracted in Step S120. As to the curve zone, it is especially important to consider a difference in turning radius between inner front and rear wheels of the routing object A during turning.

Figure 7:
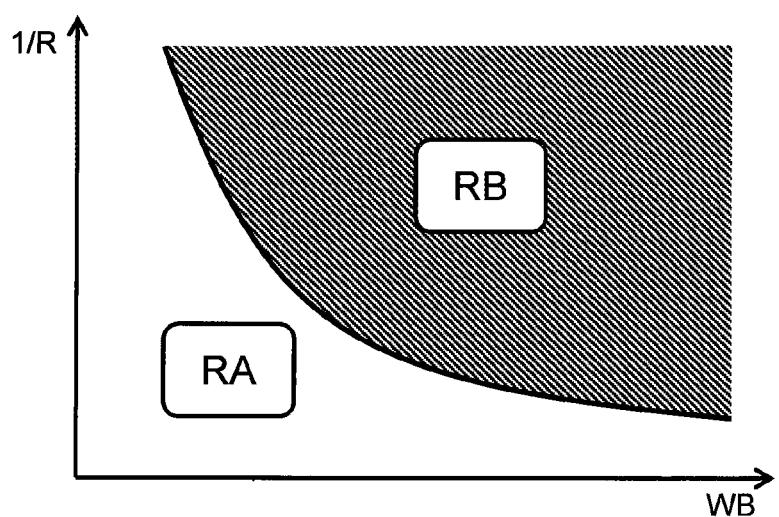
FIG. 7 is a conceptual diagram for explaining the method of determining the target travel route in the embodiment of the present disclosure.

FIG. 7 is a conceptual diagram for explaining an example of the judgment method considering the difference in turning radius between inner front and rear wheels. A horizontal axis represents the wheel base WB of the routing object A. A vertical axis represents the curvature 1/R of the curve zone. In FIG. 7, RA denotes a "passable region", and RB denotes an "impassable region". The difference in turning radius between inner front and rear wheels becomes larger as the wheel base WB increases (the difference in turning radius between inner front and rear wheels is empirically given by WB/3). Moreover, the difference in turning radius between inner front and rear wheels becomes larger as the curvature 1/R increases. As the difference in turning radius between inner front and rear wheels becomes larger, probability that the routing object A can pass through the curve zone decreases.

Based on the relationship shown in FIG. 7, the autonomous driving control device 120 judges whether or not the routing object A can pass through the curve zone. That is, the autonomous driving control device 120 judges whether or not the routing object A can pass through the curve zone based on the curvature parameter obtained in Step S120 and the size information 270.

Moreover, there is a possibility that the travel route includes a narrow zone whose roadway width is small. Therefore, the autonomous driving control device 120 may consider the width W of the routing object A to judge whether or not the routing object A can pass through the travel route without protruding from the roadway. A width of the roadway on the travel route can be obtained from the map information 230.

Moreover, there is a possibility that the travel route includes a point where a vehicle height is limited. The autonomous driving control device 120 may consider the height of the routing object A to judge whether or not the routing object A can pass through the travel route. An upper limit of the vehicle height can be obtained from the map information 230.

If it is judged that the routing object A cannot pass through the travel route (Step S130; No), the processing returns back to Step S110. That is, the autonomous driving control device 120 creates another travel route (re-routing). On the other hand, if it is judged that the routing object A can pass through the travel route (Step S130; Yes), the processing proceeds to Step S140.

In Step S140, the autonomous driving control device 120 determines the travel route created in Step S110 as the target travel route to the destination. In this manner, the autonomous driving control device 120 refers to the map information 230 and the size information 270 to determine a travel route through which the routing object A can pass without protruding from a roadway as the target travel route.

The size of the routing object A varies depending on whether or not the vehicle 1 tows the towed vehicle T (see FIGS. 2 and 3). Therefore, the target travel route may also vary depending on whether or not the vehicle 1 tows the towed vehicle T.

3-2. Vehicle Travel Control

While the vehicle 1 is traveling along the target travel route, the autonomous driving control device 120 executes vehicle travel control that controls travel of the vehicle 1. The vehicle travel control includes steering control, acceleration control, and deceleration control. More specifically, the autonomous driving control device 120 executes, based on the driving environment information 200, the vehicle travel control such that the vehicle 1 follows a "target path (target trajectory)". The above-described target travel route is an overall route to the destination, whereas the target path means a local trajectory of the vehicle 1. For example, the target path includes a trajectory of the vehicle 1 within a certain lane. Moreover, the target path includes trajectories of the vehicle 1 for lane change and overtaking.

According to the present embodiment, the autonomous driving control device 120 considers the size of the routing object A also when determining the target path. As a result, it is possible to appropriately determine the target path such that a safety margin is satisfied.

Figure 8:
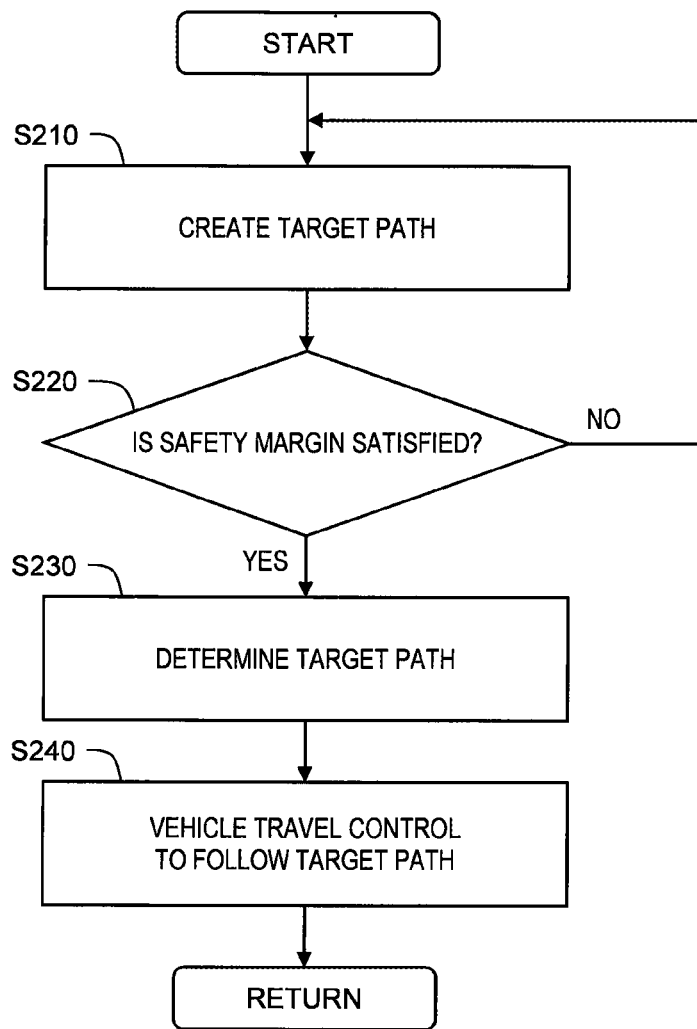
FIG. 8 is a flow chart for explaining vehicle travel control in the embodiment of the present disclosure.

FIG. 8 is a flow chart for explaining the vehicle travel control in the present embodiment. A process flow shown in FIG. 8 is repeatedly executed every certain cycle.

In Step S210, the autonomous driving control device 120 creates a target path based on the driving environment information 200. For example, the autonomous driving control device 120 refers to the map information 230 to create a target path for making a lane change from a merge lane to a main line. As another example, the autonomous driving control device 120 refers to the sensor-detected information 240 (the target information) to create a target path for overtaking a preceding vehicle. After that, the processing proceeds to Step S220.

In Step S220, the autonomous driving control device 120 determines whether or not the target path created in Step S210 satisfies a safety margin. More specifically, the autonomous driving control device 120 calculates a distance between the routing object A and a surrounding object (e.g., a wall, a surrounding vehicle), assuming that the routing object A travels along the target path. For that purpose, the autonomous driving control device 120 refers to the map information 230, the sensor-detected information 240 (the target information), and the size information 270.

If the distance between the routing object A and the surrounding object is smaller than a predetermined value, it is determined that the safety margin is not satisfied (Step S220; No). In this case, the processing returns back to Step S210. That is, the autonomous driving control device 120 creates another target path. On the other hand, if the distance between the routing object A and the surrounding object is equal to or larger than the predetermined value, it is determined that the safety margin is satisfied (Step S220; Yes). In this case, the processing proceeds to Step S230.

Figure 9:
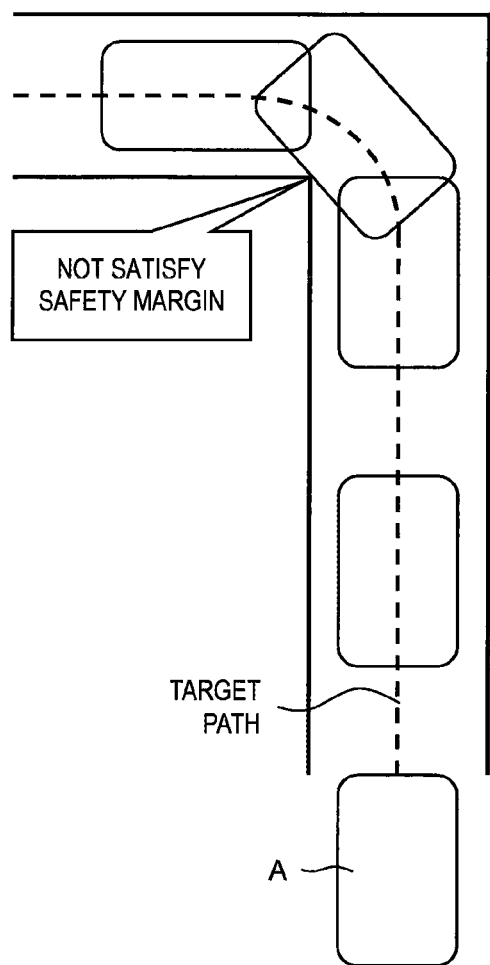
FIG. 9 is a conceptual diagram for explaining a method of determining a target path in the embodiment of the present disclosure.

FIG. 9 shows an example of the target path that does not satisfy the safety margin. The size of the routing object A can be obtained from the size information 270. The difference in turning radius between inner front and rear wheels of the routing object A during turning is empirically given by "wheel base WB/3". A position of a wall around the routing object A can be obtained from the map information 230 or the sensor-detected information 240 (the target information).

Figure 10:
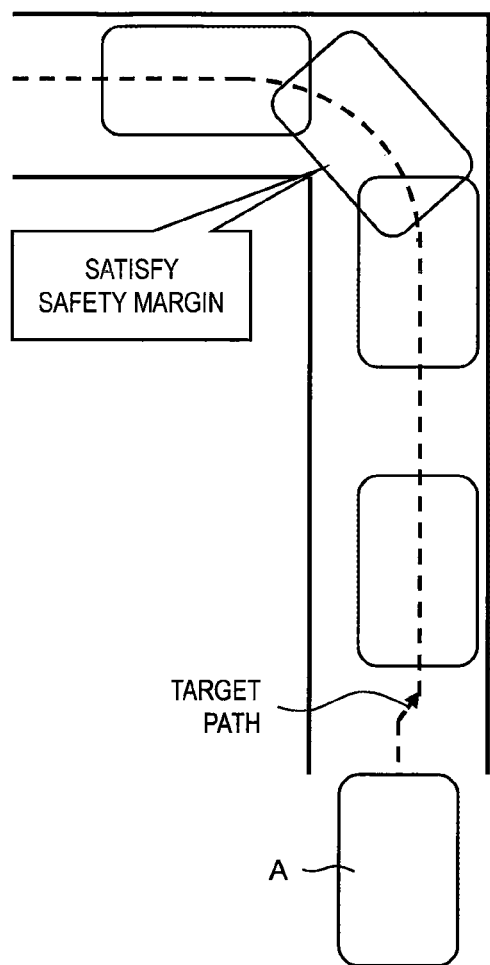
FIG. 10 is a conceptual diagram for explaining the method of determining the target path in the embodiment of the present disclosure.

FIG. 10 shows an example of the target path satisfying the safety margin. The target path shifts to the outer side as compared with the case of FIG. 9. Using the target path shown in FIG. 10 enables smoother vehicle travel.

In Step S230, the autonomous driving control device 120 adopts the target path created in Step S210. After that, the processing proceeds to Step S240.

In Step S240, the autonomous driving control device 120 actuates the travel device 70 to execute the vehicle travel control (steering control, acceleration control, deceleration control) such that the vehicle 1 follows the target path. When a margin with respect to the surrounding object is comparatively small, the autonomous driving control device 120 may alert the driver through the HMI unit 60.

As described above, the autonomous driving control device 120 refers to the size information 270 to determine the target path such that the safety margin is satisfied. As a result, smoother vehicle travel is possible.

What is claimed is:

1. An autonomous driving system installed on a vehicle and comprising:
    an electronic control unit (ECU), including a processor and a memory, programmed to:
    acquire driving environment information indicating driving environment for the vehicle; and
    control autonomous driving of the vehicle based on the driving environment information,
    wherein the driving environment information includes:
    map information; and
    size information indicating a size of a routing object, wherein the routing object includes a combination of the vehicle and a towed vehicle towed by the vehicle,
    wherein the size information includes a wheel base that is a distance between a front wheel of the vehicle and a rearmost wheel of the towed vehicle, and
    wherein the ECU is further programmed to determine, based on the map information and the wheel base, a target travel route to a destination, such that the routing object can pass through a curve zone included in the target travel route without protruding from a roadway.

2. The autonomous driving system according to claim 1, wherein the ECU is further programmed to:
    calculate, based on the map information, a curvature parameter equivalent to a curvature of the curve zone included in the target travel route to the destination; and
    judge whether or not the routing object can pass through the curve zone without protruding from the roadway based on the curvature parameter and the wheel base.

3. The autonomous driving system according to claim 1, wherein the ECU is further programmed to determine a target path based on the driving environment information, and to control travel of the vehicle to follow the target path, and
    wherein the ECU is further programmed to determine, based on the size information, the target path such that a distance between the routing object and a surrounding object is equal to or larger than a predetermined value.

4. The autonomous driving system according to claim 1, wherein a length of the routing object is a sum of a length of the vehicle and a length of the towed vehicle,
    a width of the routing object is a larger one of a width of the vehicle and a width of the towed vehicle, and
    a height of the routing object is a larger one of a height of the vehicle and a height of the towed vehicle.

5. A method of autonomous driving of a vehicle, the method comprising:
    acquiring driving environment information indicating a driving environment for the vehicle; and
    controlling autonomous driving of the vehicle based on the driving environment information,
    wherein the driving environment information includes:
    map information; and
    size information indicating a size of a routing object, wherein the routing object includes a combination of the vehicle and a towed vehicle towed by the vehicle,
    wherein the size information includes a wheel base that is a distance between a front wheel of the vehicle and a rearmost wheel of the towed vehicle, and
    wherein the method further comprises:
    determining, based on the map information and the wheel base, a target travel route to a destination such that the routing object can pass through a curve zone included in the target travel route without protruding from a roadway.

* * * * *